United States Patent
Chickering (12)

(10) Patent No.: US 6,360,224 B1
(45) Date of Patent: Mar. 19, 2002

(54) FAST EXTRACTION OF ONE-WAY AND TWO-WAY COUNTS FROM SPARSE DATA

(75) Inventor: D. Maxwell Chickering, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/298,723

(22) Filed: Apr. 23, 1999

(51) Int. Cl.⁷ .................................................. G06F 17/30
(52) U.S. Cl. .............................. 707/100; 705/7; 707/3
(58) Field of Search ............................. 707/1, 3–4, 6, 707/100, 101, 202; 705/7, 10

(56) References Cited

U.S. PATENT DOCUMENTS

| | | | | |
|---|---|---|---|---|
| 5,704,017 A | * | 12/1997 | Heckerman et al. | 395/61 |
| 5,977,889 A | * | 11/1999 | Cohen | 341/55 |
| 6,009,432 A | * | 12/1999 | Tarin | 707/10 |
| 6,117,185 A | * | 9/2000 | Schmidt | 717/9 |
| 6,154,736 A | * | 11/2000 | Chickering et al. | 706/59 |

FOREIGN PATENT DOCUMENTS

EP          0 789 309          8/1997

OTHER PUBLICATIONS

Andrew Moore, Mary Soon Lee, Cached Sufficient Statistics for Efficient Machine Learning with Large Datasets, Journal of Artificial Intelligence Research 8 (Mar. 1998) 67–91.*

U.S. application No. 08/902,759, "Belief Networks" unissued, pending ap.

Aizawa, Reducing the dimensions of attributes by selection and aggregation, Discovery Science, First Int'l Conference, DS '98, Proceedings, Fukuoka, Japan, Dec. 14–16, 1998, pp. 417–418.

Gessert, Handling missing data by using stored truth values, Sigmod Record, Sep. 1991, US, vol. 20, No. 3, pp. 30–42.

Sung, Data mining in a large database environment, IEEE Int'l Conf on Systems, Man, and Cybernetics, New York, IEEE, Oct. 14, 1996, pp. 988–993, specifically p 991, col 1–p 992, col 2 I 29.

Mueller, Fast sequential and parallel algorithms for associate rule mining, a comparison, Technical Report CS–TR–3515, Aug. 1995, Univ. of Maryland, College Park, pp. 1–76, specifically p 22 1 36–p 24 I 7.

* cited by examiner

*Primary Examiner*—Hosain T. Alam
*Assistant Examiner*—Joon Hwan Hwang
(74) *Attorney, Agent, or Firm*—Amin & Turocy, LLP (57) ABSTRACT

Two-way counts utilizing sparse representation of a data set. In one embodiment, a computer-implemented method such that a data set is first input. The data set has a plurality of records. Each record has at least one attribute, where each attribute has a default value. The method stores a sparse representation of each record, such that the value of an attribute of the record is stored only if it varies from the default value. A data model is then generated, utilizing the sparse representation. Generation of the data model includes initially extracting two-way counts from the sparse representation. Finally, the model is output.

10 Claims, 8 Drawing Sheets

FIG. 1

| RECORD | A | B | C |
|--------|---|---|---|
| 1 | 0 | 0 | 1 |
| 2 | 1 | 0 | 0 |
| 3 | 1 | 1 | 0 |
| 4 | 1 | 0 | 0 |

FIG. 2A

|       | A = 0 | A = 1 |
|-------|-------|-------|
| B = 0 | 1     | 2     |
| B = 1 | 0     | 1     |

FAST EXTRACTION OF ONE-WAY AND TWO-WAY COUNTS FROM SPARSE DATA

RELATED APPLICATIONS

This application is related to the cofiled, coassigned, and copending U.S. Application No. 09/298,600 which is entitled "Fast Clustering with Sparse Data," and is hereby incorporated by reference.

FIELD OF THE INVENTION

This invention relates generally to data modeling, and more particularly to extracting two-way counts utilizing a sparse representation of the initial data set.

BACKGROUND OF THE INVENTION

Data modeling has become an important tool in solving complex and large real-world computerizable problems. For example, a web site such as www.msnbc.com has many stories available on any given day or month. The operators of such a web site may desire to know whether there are any commonalties associated with the viewership of a given set of programs. That is, if a hypothetical user reads one given story, can with any probability it be said that the user is likely to read another given story. Yielding the answer to this type of inquiry allows the operators of the web site to better organize their site, for example, which may in turn yield increased readership.

For problems such as these, data analysts frequently turn to advanced statistical tools. Such tools include building and analyzing statistical models such as naïve-Bayes models, decision trees, and branchings, which are a special class of Bayesian-network structures, all of which are known within the art. To construct these models, generally two-way counts must first be extracted from the source data. Two-way counts for a pair of discrete variables define, for each pair of states of the two variables (each pair of states being a unique pair of one variable having a given value and the other variable having another given value, such that no pair has the same values for the variables as does another pair), the number of records in which that pair of states occur in the data. In other words, the counts summarize the information that the data provides about the relationship between the two variables, assuming that this relationship is not influenced by the values for any of the other variables in the domain.

A disadvantage to extracting two-way counts is that generally, as the size of the data set increases, the running time to perform the extraction increases even moreso. This is problematic for problems such as the web site example just described, because typically the data set can run into the millions of records, impeding timely analysis thereof. Thus, a data analyst may not build models that are based on two-way counts extraction as much as he or she would like to.

For these and other reasons, there is a need for the present invention.

SUMMARY OF THE INVENTION

The invention relates to extraction of two-way counts utilizing a sparse representation of the data set. In one embodiment, a data set is first input. The data set has a plurality of records. Each record has at least one attribute, where each attribute has a default value. The method stores a sparse representation of each record, such that the value of an attribute of the record is stored only if it varies from the default value (that is, if the value equals the default value, it is not stored). A data model is then generated, utilizing the sparse representation. Generation of the data model includes initially extracting two-way counts from the sparse representation. Finally, the model is output.

In one embodiment, extracting the two-way counts from the sparse representation includes explicitly counting two-way counts only for values of the attributes that vary from the default values, and explicitly counting one-way counts also only for values of the attributes that vary from the default values. The remaining one-and two-way counts are then derived. For a data set where most attributes of most records are equal to default values, this embodiment of the invention greatly speeds the run time of extracting two-way counts, and, thus, greatly decreases the run time in which statistical models utilizing two-way counts can be generated.

The invention includes computer-implemented methods, machine-readable media, computerized systems, and computers of varying scopes. Other aspects, embodiments and advantages of the invention, beyond those described here, will become apparent by reading the detailed description and with reference to the drawings.

BRIEF DESCRIPTION OF THE DRAWINGS

FIG. 2($a$) is a diagram of an example data set that can be used in conjunction with embodiments of the invention;

FIG. 2($b$) is a diagram of an example contingency table that can be constructed by embodiments of the invention;

FIG. 2($c$) is a diagram of an example contingency table in which only non-default attribute values have been explicitly counted, according to an embodiment of the invention;

FIG. 2($d$) is a diagram of an example one-way counts in which only non-default attribute values have been explicitly counted, according to an embodiment of the invention;

FIG. 2($e$) is a diagram of an example contingency table in which the one-way and two-way counts not explicitly counted in FIGS. 2($c$) and 2($d$) have been derived, according to one embodiment of the invention;

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The detailed description is divided into sections as follows. First, a description of an operating environment in conjunction with which embodiments of the invention may be practiced is provided. A description of a sparse representation of a data set according to an embodiment of the invention is then presented. Thereafter, a description of a method according to an embodiment of the invention is given. A description of a system according to an embodiment of the invention is then provided. Example models that can be generated (that is, parameterized) in accordance with embodiments of the invention because of the two-way counts extraction provided by embodiments of the invention are then described, followed by a conclusion section.

Operating Environment

Figure 1:
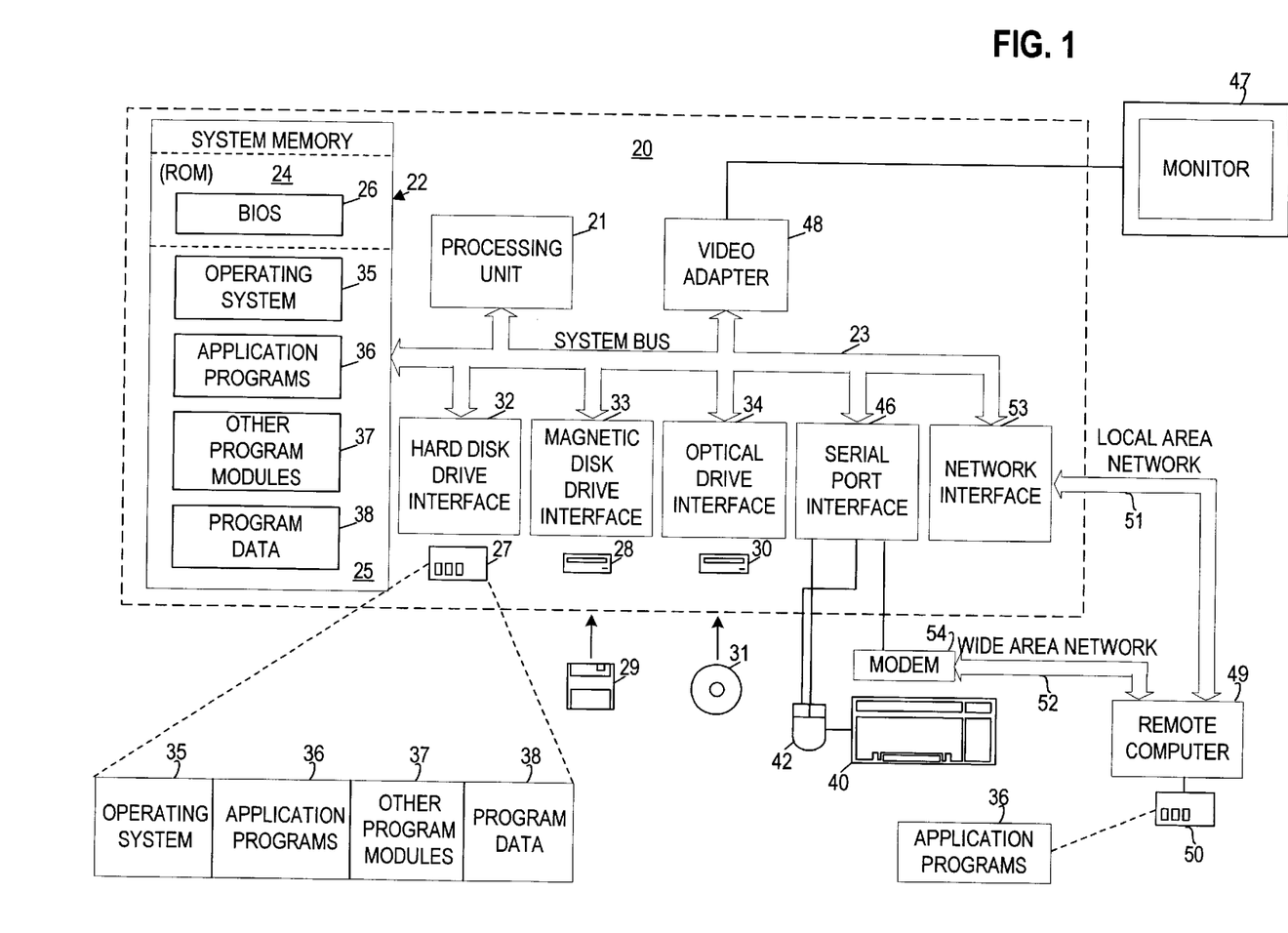
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Sparse Representation

In this section of the detailed description, sparse representation of a data set according to one embodiment of the invention is presented. The sparse representation is then used in conjunction with a two-way counts extraction algorithm described in the next section of the detailed description to provide for greatly reduced run times. The description in this section is made in conjunction with reference to FIG. 3.

In general, a sparse representation is defined as: for each attribute in a domain, a default value is defined. The default value for an attribute is that value that occurs most frequently in the data set. For example, in the television-watching example of the preceding section, "did not watch" is likely the most frequent value for most television shows for a user (since a given user can only watch one television show at a time). The records of a sparse representation explicitly store only those values for attributes that do not have their default value. That is, in storing a sparse representation of each record, the value of those attributes of the record are stored only upon determining that such values vary from the default values for that attribute.

Figure 3:
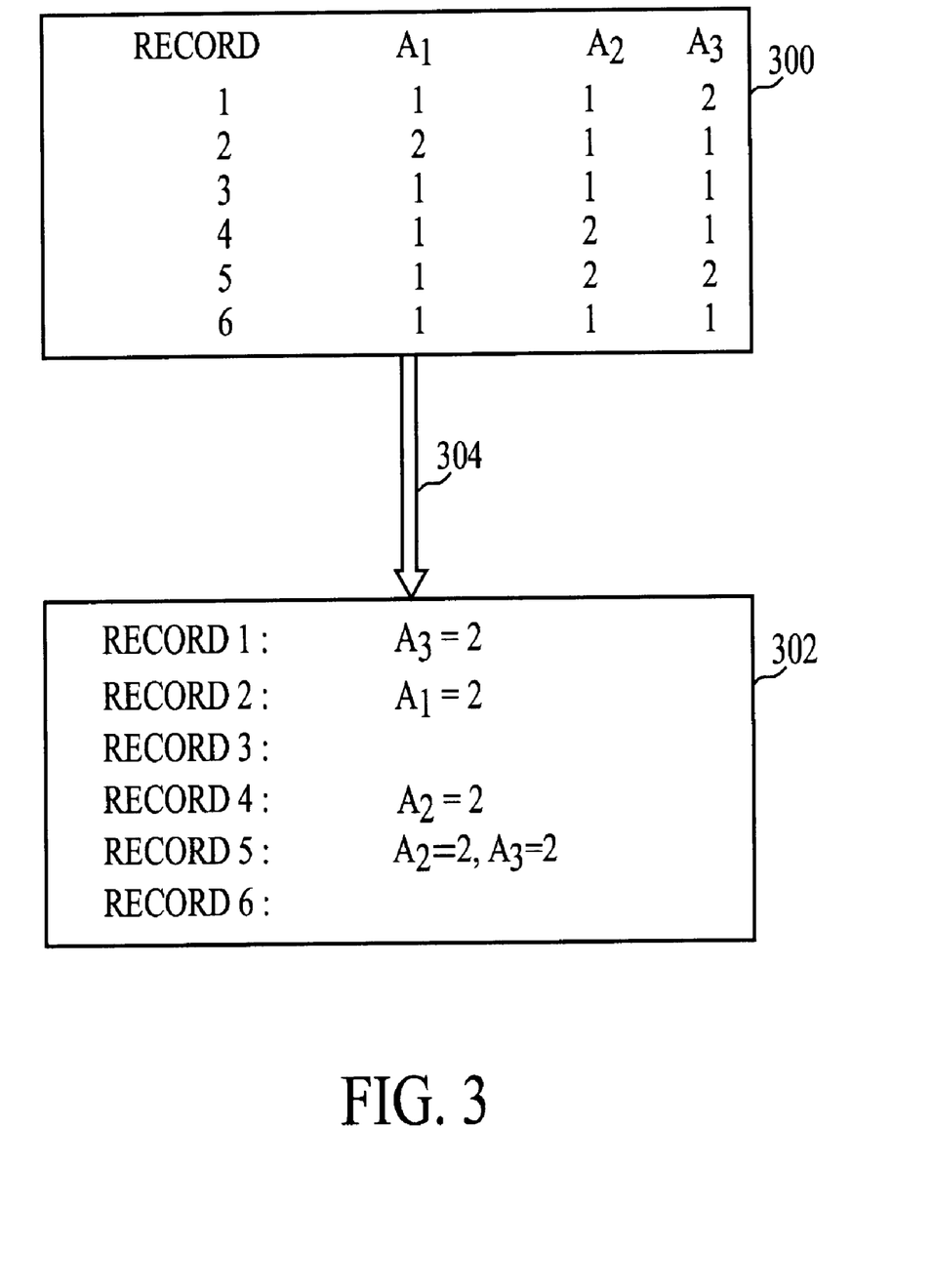
FIG. 3 is a diagram showing a sparse representation of a data set according to an embodiment of the invention.

This is shown by reference to FIG. 3, which is a diagram of six records in an example data set, along with its corresponding sparse representation. The data set 300 of FIG. 3 thus has three binary attributes $A_1$, $A_2$, and $A_3$, such that the default value for each attribute is 1. Furthermore, as shown in FIG. 3, the data set 300 has six records.

Therefore, in a sparse representation of the data set, as represented by 302 of FIG. 3, each record is stored as a list of attribute/value pairs, one such pair for each attribute in the record that does not have its default value. Thus, for attributes of a record that have the default value, no such pair is stored. This means that the representation of the data set as stored by embodiments of the invention is sparse, in that only attribute values of a record that vary from the default values for those attributes are stored.

To find the value of any attribute in a given record, the list of pairs is traversed. If the attribute in question is encountered in the list, then the corresponding value is returned. Otherwise, the default value of the attribute is returned.

It is noted that using this representation can dramatically reduce the memory overhead for storing a large dataset. That is, where most attribute values for a given record in a given data set will be equal to the default values for those attributes, such attribute values are not stored in the sparse representation of the invention—rather only those attribute values that vary from the default values for those attributes are stored. As will be described in the next section of the detailed description, such a sparse representation provides for greatly reduced run times in generating a data model from the data set (for example, by the EM algorithm).

As shown in FIG. 3, the sparse representation 302 is generated from the data set 300 by a generating mechanism 304. The generating mechanism 304 can in one embodiment be a software program running on a computer such as that described in the first section of the detailed description, although the invention is not so limited. In such an embodiment, the data set 300 and the sparse representation 302 can be stored as data representing the data set 300 and the sparse representation 302, respectively, as residing on a computer-readable medium, such as a memory or a hard disk drive. Again, the invention is not so limited.

Method

Figure 4:
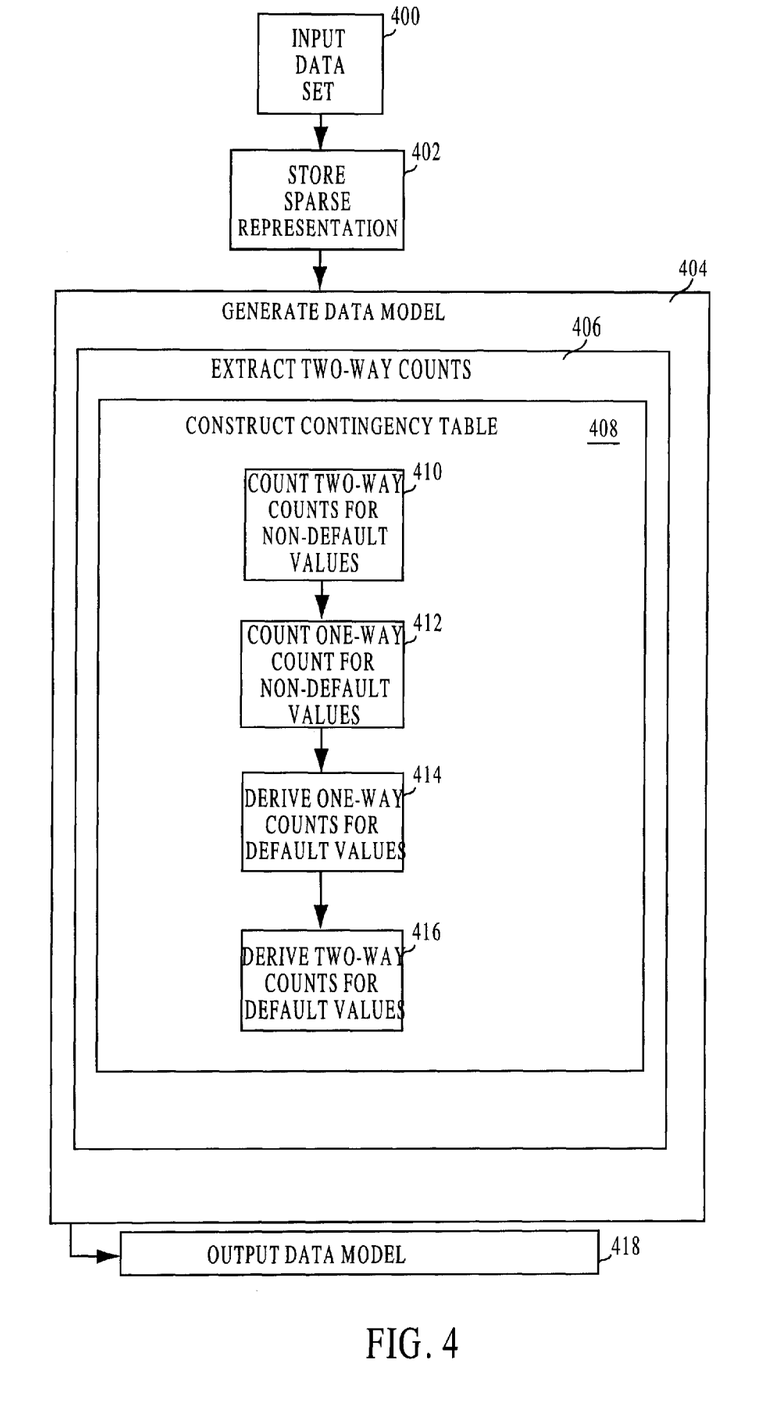
FIG. 4 is a flowchart of a method according to an embodiment of the invention.

A method according to an embodiment of the invention is shown in FIG. 4. The method is a computer-implemented method that generates a data model, including initially extracting two-way counts, utilizing a sparse representation of a data set. For example, the data model can be a naive-Bayes model, a decision tree, or a branching, which is a member of a particular class of Bayesian-network structures, all of which are known within the art. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Before a description of the method of FIG. 4 is given, background regarding extraction of two-way counts is first provided. As has been described in the background section, two-way counts for a pair of discrete variables define, for each pair of states of the two variables, the number of records in which that pair of states occur in the data. The counts thus summarize the information that the data provides about the relationship between the two variables, assuming that this relationship is not influenced by the values for any of the other variables in the domain.

A contingency table can be used in embodiments of the invention to represent two-way counts, although the invention itself is not so limited. A contingency table is defined by way of example. Let $X_i$ and $X_j$ denote two (discrete) variables (viz., attributes) in the domain (viz., set of all variables in the data set), and assume that $X_i$ has $r_i$ states (viz., different values that it can take on), and that $X_j$ has $r_j$ states (viz., different values that it can take on). A contingency table for $X_i$ and $X_j$ for a data set D is a $r_i \times r_j$ table, where the cell in column $x_j$ and row $x_j$ stores the number of records in D for which $X_i=x_j$ and $X_j=\times x_j$.

For example, a data set 200 for a domain of three binary variables {A,B, C } is shown in FIG. 2(*a*). There are a total of four records. A contingency table 202 for the data set, representing the two-way counts for A and B in the data set, is shown in FIG. 2(*b*). As used herein, $SS(X_i, X_j)$ denotes the set of two-way counts between $X_i$ and $X_j$. To denote a specific count in the set $SS(X_i=x_i, X_j=x_j)$ is used. Thus, in the contingency table 202 of FIG. 2(*b*) SS(A=1, B=0)=2.

Furthermore, before describing the method of FIG. 4, an example showing how a sparse representation of a data set, as has been described, can be used in accordance with an embodiment of the invention to reduce the amount of time it takes to extract two-way counts from the data set is provided. The method of FIG. 4 is based on this example, and generalizes from the example; however, description of the example is first provided to better understand embodiments of the invention. In accordance with embodiments of the invention, elements in a contingency table are updated only for those entries corresponding to non-default values for attributes. The remaining elements are then derived from the others using one-way counts. Thus, to perform this derivation, the one-way counts for non-default values are explicitly accumulated, and then the one-way counts for the default values are derived using the known number of records in the data set. In other words, only two- and one-way counts are explicitly accumulated (or, counted) for non-default attribute values; one- and two-way counts for default attribute values are derived.

An example of this is shown in FIGS. 2(*c*), 2(*d*) and 2(*e*). A contingency table is desired for the three-valued variables (viz., attributes) A and B. The default value for each variable is 0, and there are 200 records in the data set. The values SS(A,B) are first accumulated only for non-default values of A and B—that is, for those entries where A ≠ 0 and B ≠ 0. An example result is shown as the contingency table 204 of FIG. 2(*c*). Next, the one-way counts for the non-default values of A and B are accumulated, an example result of which is shown as the one-way counts 206 of FIG. 2(*d*).

Figure 2A:
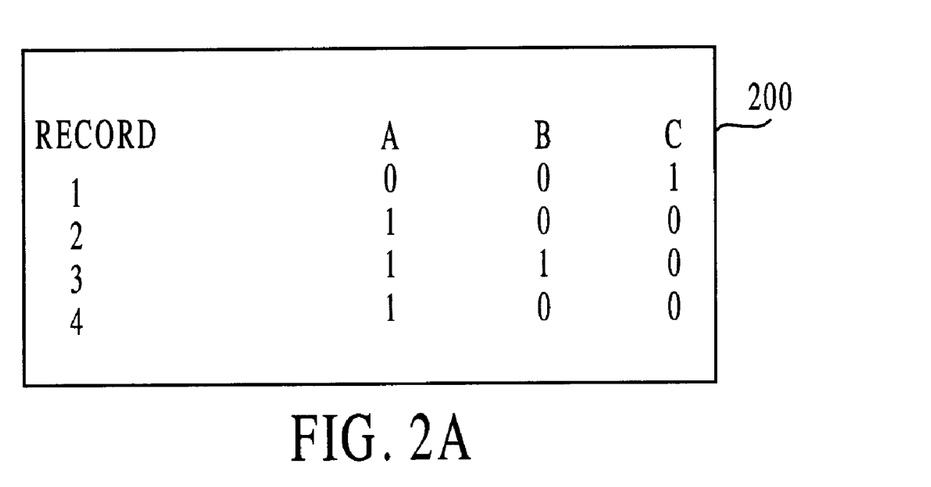
Figure 2B:
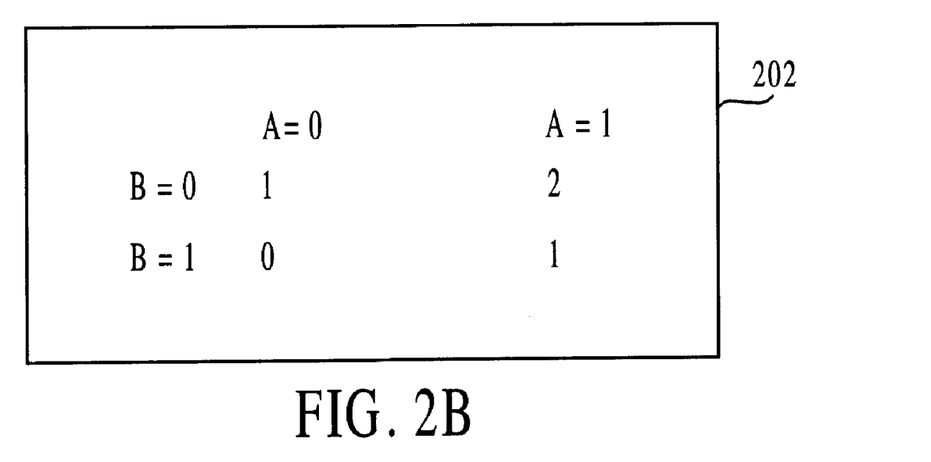
Figure 2C:
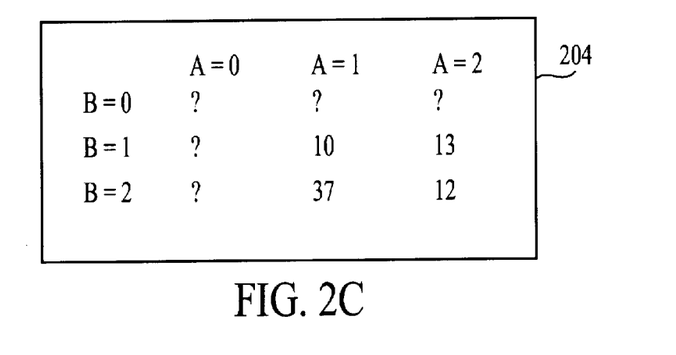
Figure 2D:
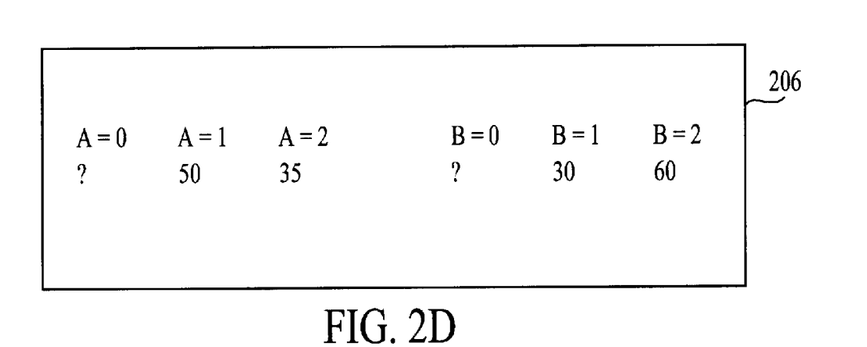
Figure 2E:
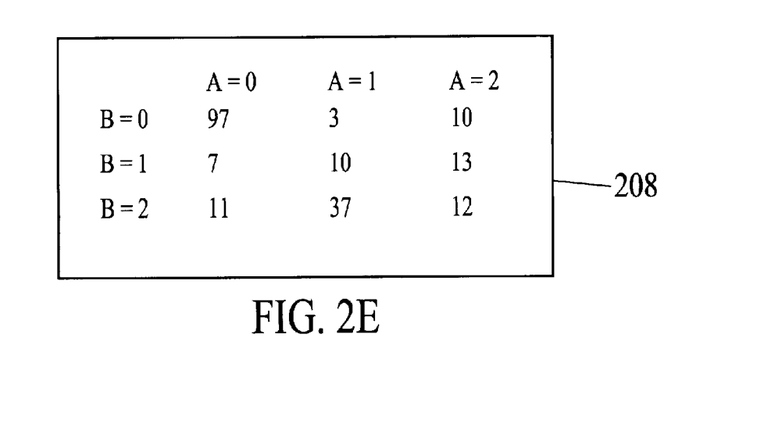

Since there are 200 records in the data set, it can be concluded that SS(A=0)=115 (=200−50−35) and that SS(B=0)=110 (=200−30−60)—the default one-way counts are thus derived, not accumulated. The sum of the cells in each column must equal the one-way count of the corresponding value of A. Similarly, the sum of the cells in each row must equal the one-way count of the corresponding value of B. For example, since SS(B=1)=SS(A=0, B=1)+SS (A=1, B=1)+SS (A=2, B=1), therefore SS(A=0, B=1)=30−10−13= 7. Therefore, all the unknown elements of the contingency table can be filled in without looking at any more data. Note that SS(A=0, B=0) cannot be derived until the necessary unknown cells have been derived. Thus, the contingency table 208 of FIG. 2(*e*) results, such that two-way counts including a default value for either variable A and/or B have been derived, not explicitly accumulated.

The method of FIG. 4 is now described. As has been stated, the method of FIG. 4 is a generalization of the example of FIGS. 2(*c*)–2(*e*) that has been just been described. In 400, a data set having a plurality of records is input. The data set desirably represents a real-world event or events—for example, the stories read by users of a web site, the television shows watched by viewers, etc. Each record has at least one attribute. The set of all attributes is referred to as the attribute set for the problem domain. Each attribute has a default value. In general, the data set is desirably such that most attribute values for a given record are equal to the default value, although the invention is not so limited.

In 402, a sparse representation of the data set is generated, such that a sparse representation of each record of the data set is stored. This is accomplished as has been described in a previous section of the detailed description. That is, only the values of the attributes of a given record are stored that vary from the default values for the attributes—in other words, the value of an attribute of a record is stored only upon determining that the attribute of the record has a value varying from the default value for this attribute.

In 404, a data model of the data set is generated, utilizing the sparse representation generated and stored in 402. The invention is not so limited to the type of data model generated. For example, a naïve-Bayes model, a decision tree, and a branching are all types of models that can be generated in accordance with the invention, and all of which are known within the art. Generation of the data model includes initially extracting two-way counts from the sparse representation, as represented by 406 in FIG. 4, and as is now described. The construction of a data model based on these two-way counts extracted are known within the art. In one embodiment, extraction of two-way counts can involve constructing a contingency table in 408, although the invention is not necessarily so limited.

Thus, in 410, two-way counts for values of attributes varying from the default values for those attributes are first accumulated, or counted. This corresponds to description of the preceding example provided in conjunction with FIG. 2(*c*) above. Thus, only two-way counts are accumulated for records in the data set having a non-default value for every attribute thereof. In one embodiment, the two-way counts accumulated in 410 are referred to as first two-way counts, for brevity of reference.

It is noted that the one- and two-way non-default counts are accumulated simultaneously during a single scan of the records in the data. Insofar as they are separated within the method of FIG. 4, this is accomplished for illustrative purposes only, for better understanding of the invention, as those of ordinary skill within the art can appreciate.

Next, in 412, one-way counts for values of attributes varying from the default values for those attributes are accumulated, or counted. 412 can be performed at the same time as, before, or after 410; the invention is not so limited. 412 furthermore corresponds to the description of the preceding example provided in conjunction with FIG. 2(*d*) above. Thus, only one-way counts are accumulated for records in the data set having a non-default value for any attribute thereof. In one embodiment, the one-way counts accumulated in 412 are referred to as first one-way counts, for brevity of reference.

In 414, one-way counts for the default values of the attributes are derived, based on the first one-way counts. For example, 414 corresponds to the description of the preceding example whereby the one-way counts A=0 and B=0 were derived. Thus, the one-way counts derived are for the records in the data set having a default value for any attribute thereof. Unlike the first two-way counts and the first one-way counts that were explicitly accumulated or counted in 410 and 412, the one-way counts in 414 are derived. In one embodiment, the one-way counts derived in 414 are referred to as second one-way counts, for brevity of reference and to distinguish them from the first one-way counts accumulated in 412.

In 416, two-way counts for the default values of the attributes are derived, based on the first one-way counts, the first two-way counts, and the second one-way counts. For example, 416 corresponds to the description of the preceding example provided in conjunction with FIG. 2(*e*) above. Thus, the two-way counts derived are for the records in the data set having a default value for any attribute thereof. Like the second one-way counts derived in 414, the two-way counts in 416 are also derived, and not explicitly accumulated or counted. In one embodiment, the two-way counts derived in 416 are referred to as second two-way counts, for brevity of reference and to distinguish them from the first two-way counts accumulated in 410.

The data model is output in 418. The invention is not limited to the manner by which the data model is output. For example, in one embodiment, it can be output to a further analysis program or software component, that allows for conclusions to be drawn regarding the data set, as the data model was generated therefrom. As another example, a diagram of the data model can be displayed on a displayed device, or printed to a printer, etc.

An algorithm embodying the method of FIG. 4, specifically 408, 410, 412, 414 and 416 of FIG. 4, can in one embodiment be written as follows, although the invention is not so limited:

Algorithm ConstructContingencyTablesSparseData
Input: A sparse dataset D consisting of m
A set of variable pairs P={$P_1, \ldots, P_k$}
Output: A set of contingency tables, one table SS($X_i, Y_i$) for each $P_i \in P$
  For each pair $P_i = \{X_i, Y_i\}$
    Initialize SS($X_i, Y_i$) to zero for all values of $X_i$ and $Y_i$
  For each variable $X_i$
    Initialize SS($X_i$) to zero for all values of $X_i$
  For each record in the dataset
    For each variable $X_i$ that occurs in non-default state $x_i$
      Increment SS($X_i = x_i$) by one
    For each pair $P_i = \{X_i, Y_i\}$ such that both $X_i$ and $Y_i$ occur in a non-default state in the record
      Let $x_i$ and $y_i$ be the value for $X_i, Y_i$ in the record, respectively Increment SS($X_i = x_i, Y_i = y_i$) by one
  For each variable $X_i$
    DeriveDefaultOneWayCounts (SS($X_i$), m)
  For each pair $P_i = \{X_i, Y_i\}$
    DeriveDefaultTwoWayCounts (SS($X_i, Y_i$), SS($X_i$), SS($Y_i$))
End Algorithm Algorithm DeriveDefaultOneWayCounts
Input: A one-way count SS(X) for variable X that has an invalid (unknown) entry for the default state of X
A count m of the total number of records in the data
Output: A one-way count SS(X) for variable X that has all entries filled in
  Let d denote the default state of X
  Define the invalid entry according to $$SS(X = d) = m - \sum_{x \neq d} SS(X = x)$$

End Algorithm
Algorithm DeriveDefaultTwoWayCounts
Input: A two-way count SS(X, Y) for variables X and Y that has invalid (unknown)
  entries for all cells corresponding to default state of X or Y (or both)
  A one-way count SS(X) for variable X that has all entries filled in
  A one-way count SS(Y) for variable Y that has all entries filled in
Output: A two-way count SS(X, y) for variables X and Y that has all entries filled in   Let $d_x$ denote the default state of X, and let $d_y$ denote the default state of Y
  For each non-default value x of variable X Define the invalid entry SS(X=x, Y=$d_y$) according to $$SS(X = x, Y = d_Y) = SS(X = x) - \sum_{y \neq d_Y} SS(X = x, Y = y)$$

For each non-default value y of variable Y
    Define the invalid entry SS(X=$d_x$, Y=y) according to $$SS(X = d_X, Y = y) = SS(Y = y) - \sum_{x \neq d_X} SS(X = x, Y = y)$$

Define the invalid entry SS(X=$d_x$, Y=$d_y$) according to $$SS(X = d_X, Y = d_Y) = SS(Y = d_Y) - \sum_{x \neq d_X} SS(X = x, Y = d_Y)$$

End Algorithm

System

In this section, a system according to an embodiment of the invention. The system described herein can in one embodiment by the manner by which the method according to the previous section of the detailed description is implemented. However, the invention is not so limited. The description of the system is made in conjunction with FIG. 5.

Figure 5:
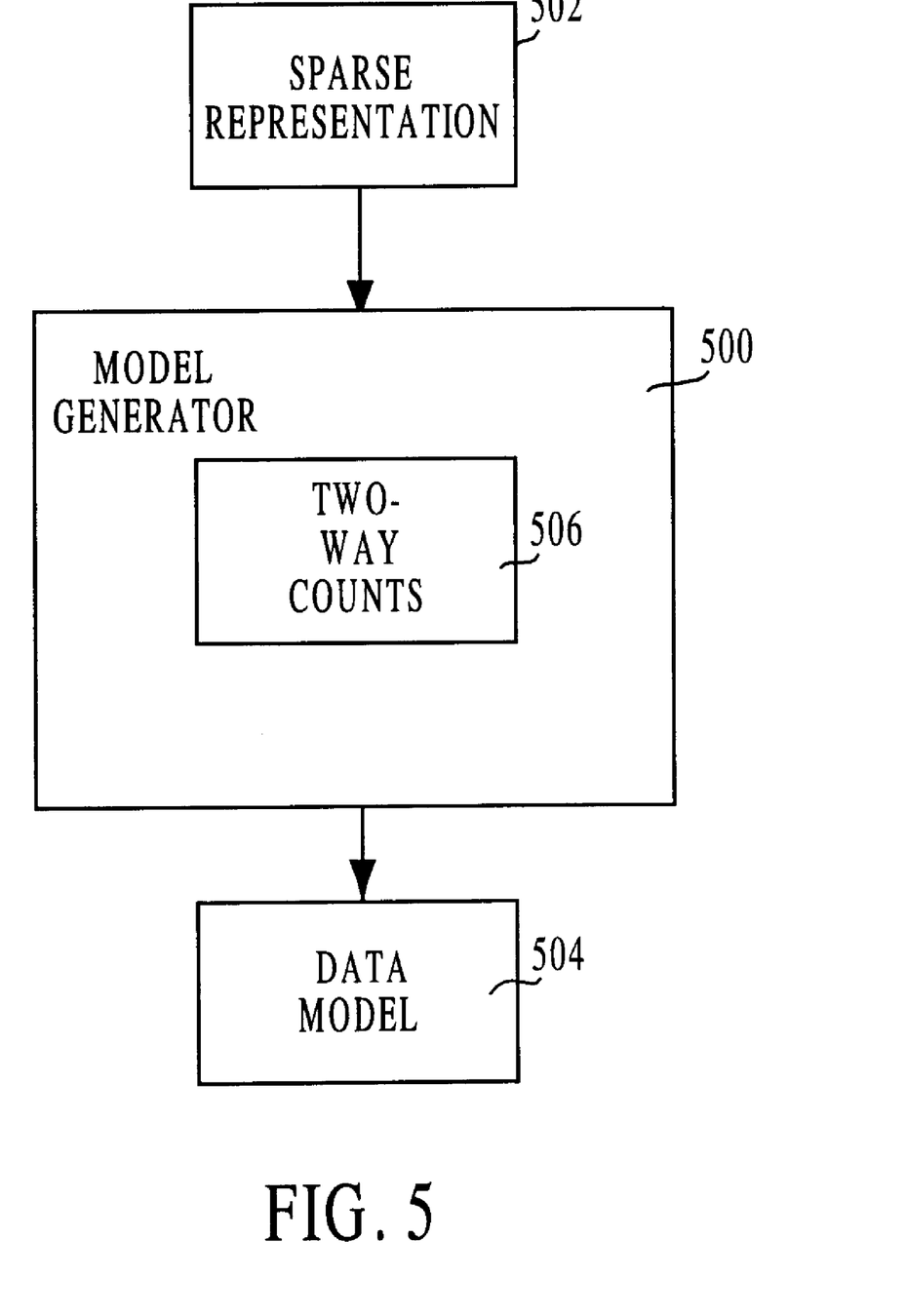
FIG. 5 is a diagram of a system according to an embodiment of the invention.

Referring now to FIG. 5, a system according to an embodiment of the invention is shown. The model generator 500 receives as an input a sparse representation of a data set 502, and generates as an output a data model 504 corresponding to the data set. In one embodiment, the model generator 500 is a computer program, although the invention is not so limited. The model generator 500 generates the data model 504 by first generating a set of two-way counts 506, based on the sparse representation.

The sparse representation 502 includes a plurality of records of a data set, where each record has at least one attribute, and each attribute has a default value, as has been described. That is, the sparse representation is such that it includes the value of an attribute of a record only if the value varies from the default value for that attribute. The data model 504 is based on the sparse representation 502. In one embodiment, the model generator 500 extracts the two-way counts 506 in order to generate the data model 504 by performing the method described in the previous section of the detailed description.

Example Data Models

In this section of the detailed description, example data models that can be generated in accordance with embodiments of the invention are described. The example data models are: a naïve-Bayes model, a decision tree, and a branching, a member of a special class of Bayesian-network structures. In particular, parameterizing a naïve-Bayes model is first described, then decision trees are described, and finally identifying the maximum branching for a Bayesian network is described. That is, there are many applications where two-way counts as have been described are sufficient to evaluate and parameterize a model of interest; in this section of the detailed description, however, three such applications are described.

Figure 6:
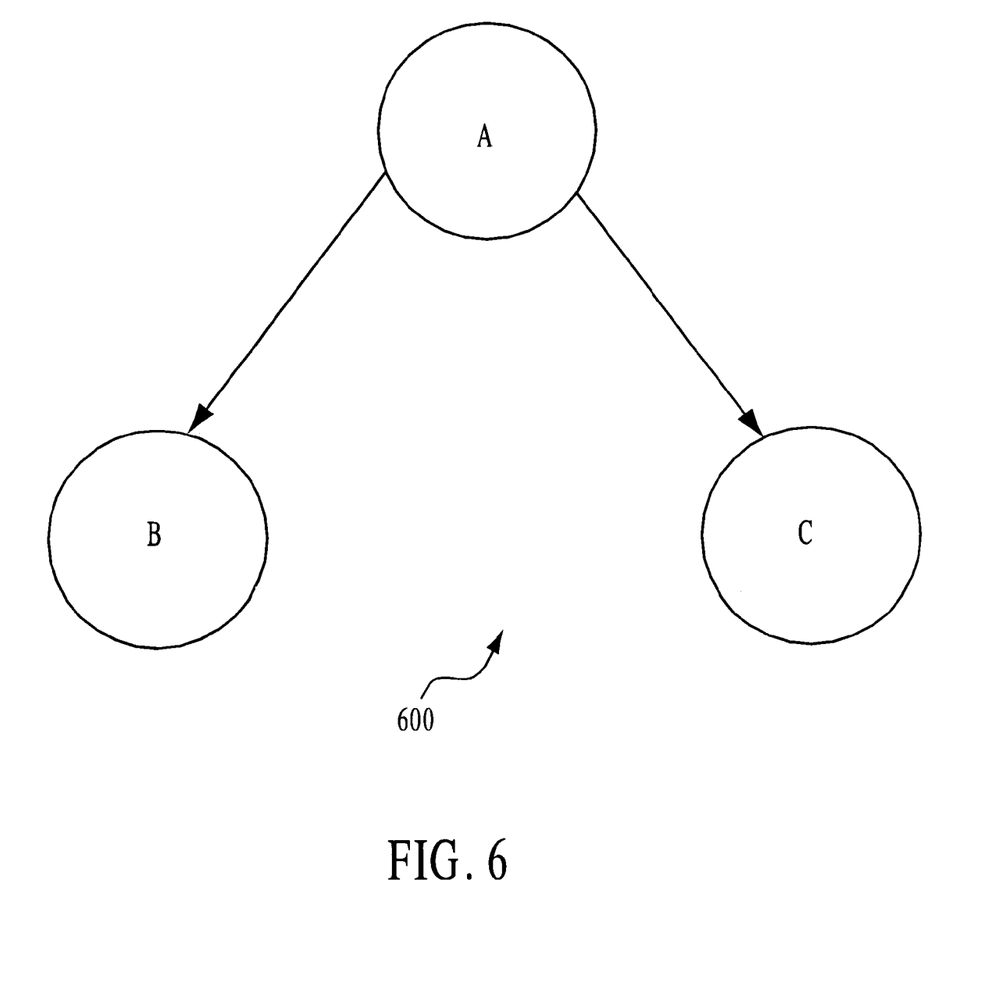
FIG. 6 is a diagram of a naïve-Bayesian model, the parameterization of which can be performed as a result of extraction of two-way counts according to an embodiment of the invention; and, FIG. 7 is a diagram of a decision tree, the parameterization of which can also be performed as a result of extraction of two-way counts according to an embodiment of the invention.

Referring first to FIG. 6, a diagram of a naïve-Bayes model is shown. A naïve-Bayes model is a Bayesian network containing a single root node. The naïve-Bayes model 600 has a three-variable domain. The model 600, referred to as the model M, asserts the assumption that, given the value of A, observations of B and C are independent. Under this assumption the joint probability of A,B and C is represented as p(A,B,C|M)=p(A|M)p(B|A,M)p(C|A,M)

Assume all variables are binary, and that the conditional distributions above are binomials. Then the parameters $\Theta$ in the model are $\Theta=\{\theta_{A=0},\theta_{A=1},\theta_{B=0|A=0},\theta_{B=1|A=0},\theta_{B=0|A=1},\theta_{B=1|A=1},\theta_{C=0|A=0},\theta_{C=1|A=0},\theta_{C=0|A=1},\theta_{C=1|A=1}\}$ A person skilled in the art can recognize that $\Theta$ need only explicitly include half of these parameters because of the constraint that probabilities must sum to one. Given a parameterized model M, $p(A=a,B=b,C=c|M,\Theta)=\theta_{A=a}\theta_{B=b|A=a}\theta^{C=c|A=a}$ Learning the parameter values $\Theta$ from data requires extracting counts. If each record stores a value for all of the variables in the domain (that is, it is said that the data is complete), only the contingency tables are needed to learn all of the parameters in the network. For example, using the maximum-likelihood estimate for the parameters, $$\theta_{B=b|A=a} = \frac{SS(A=a, B=b)}{SS(A=0, B=b)+SS(A=1, B=b)} = \frac{SS(A=a, B=b)}{SS(B=b)}$$

where SS(B=b) is simply the count of the number of records in which B=b. This one-way count can be either calculated by summing over a column or row in a contingency table, or it can be computed from the data directly.

In general, let Y denote the root node of a naïve-Bayes model, and let $X=\{X_1, \ldots, X_n\}$ denote the set of children nodes. Each root node parameter $\theta_{Y=y}$ depends on the data only via the (one-way) count SS(Y=y) and the total number of records m in the dataget. Each child-node parameter $\theta_{Xi=xi|Y=y}$ depends on the data only via the two-way count $SS(X_i=x_i, Y=y)$ and the one-way count SS(Y=y).

Decision trees are now described. A decision tree T is a structure used to encode a conditional probability distribution of a target variable Y, given a set of predictor variables $X=\{X_1, \ldots, X_n\}$. The structure is a tree, where each internal node I stores a mapping from the values of a predictor variable $X_j$ to the children of I in the tree. Each leaf node L in the tree stores a probability distribution for the target variable Y. The probability of the target variable Y, given a set of values $\{X_1=x_1, \ldots, X_n=x_n\}$ for the predictor variables, is obtained by starting at the root of T and using the internal-node mappings to traverse down the tree to a leaf node. The mappings in the internal nodes are referred to as splits. When an internal node I maps values of variable $X_j$ to its children, it is said that $X_j$ is the split variable of node I, and that I is a split on $X_j$.

Figure 7:
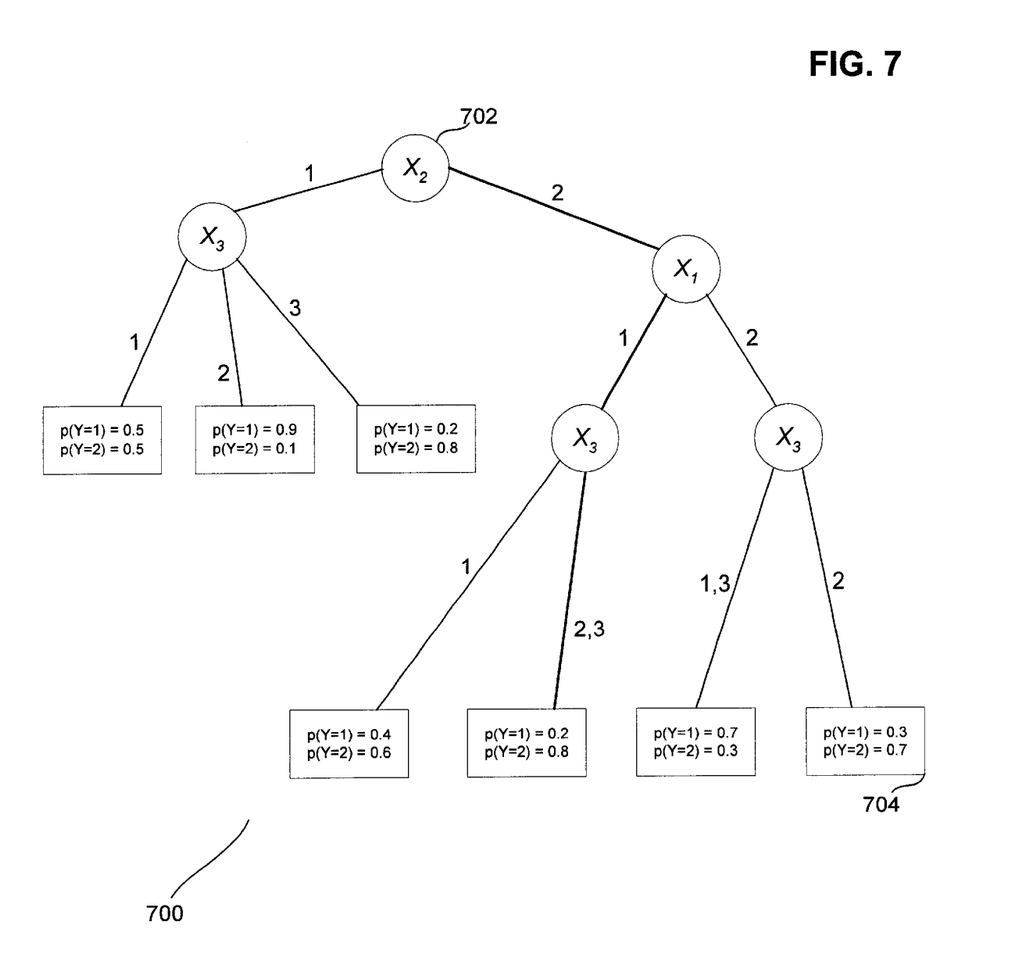

An example of a decision tree is shown in FIG. 7. The decision tree 700 stores a probability distribution $p(Y|X_1, X_2, X_3)$. In the example, Y, $X_1$, and $X_2$ all have two values $\{1,2\}$, and $X_3$ has three values $\{1,2,3\}$. In FIG. 7, the internal nodes are drawn with circles, such as the internal node 702, and the leaf nodes are drawn with boxes, such as the leaf node 704. As the tree is traversed in a downward manner, the splits at each internal node are described by the label of the node and by the labels of the out-going edges. In particular, if the current internal node of the traversal is labeled with $X_i$, a child of that node is moved to by following the edge that is labeled with the given value $x_i$.

For example, given values $\{X_1=1, X_2=2, X_3=2\}$ for the predictors, $p(Y|X_1=1, X_2=2, X_3=2)$ is obtained by traversing the tree as follows (the traversal for this prediction is emphasized in the figure by dark edges). The root node of the tree is started at, where the root node is a split on $X_2$. Because $X_2=2$, the right-most child of the root is traversed to. This next internal node is a split on $X_1$, which is has value 1, so the left child of this node is moved to. Finally, because $X_3=2$, the right child is moved to, which is a leaf node. The conditional distribution is extracted directly from the leaf, and it is concluded that $p(Y=1|X_1=1, X_2=2, X_3=2)=0.2$ and $p(Y|X_1=1,X_2=2,X_3=2)=0.8$.

As those of ordinary skill within the art can appreciate, there are many possible splits that can exist in a decision tree. A complete split is a split where each value of the split variable maps to a separate child. Examples of complete splits in the figure above are the root node, and the left child of the root node. Another type is a binary split, where the node maps one of the values of the split variable to one child, and all other values of the split variable to another. Examples of binary splits in the figure are the two children of the root node's right child. In addition, a person skilled in the art can appreciate that there are numerous other types of splits that can be utilized in a decision tree.

A standard machine-learning task is to automatically construct a decision tree for a target variable Y, given a set of data. Although there are many different such learning algorithms, they all share, as the fundamental operation, a method of growing the tree by expanding a leaf node. That is, the algorithms repeatedly replace leaf nodes by (internal) splits, creating two or more new leaf nodes.

When a leaf node is considered for replacement by a split in these algorithms, a scoring criterion is used to determine the value of the replacement. All of these criteria are functions of a set of two-way counts from (a subset of) the data. In particular, the score of splitting a leaf node on variable X is a function of a contingency table SS(Y,X). This contingency table is typically constructed from only a subset of the entire dataset.

The identification of a maximum branching for a Bayesian network is now described. Bayesian networks have become popular models to use when representing a joint probability distribution, as those of ordinary skill within the art can appreciate. In many applications, a goal is to find the best network structure, given a set of data and a scoring criterion. For all but the most trivial scoring functions, identifying the best structure is NP-hard, which those of ordinary skill within the art can appreciate is a problem in a specific class where it is generally accepted that no polynomial-time algorithm exists for solving them, and consequently heuristic search techniques are typically applied.

As those of ordinary skill within the art can appreciate, there is a special class of Bayesian-network structures, known as branchings or tree-like structures, such that each node in the network has at most one parent. Finding the best branching using most currently-used scoring criteria can be done in polynomial time. This is usually an important result because the best branching network is often a good approximation to the optimal structure. Furthermore, the best branching can be used to initialize the heuristic search algorithms.

The polynomial algorithms used to identify the best branching structure require two scores for each pair of nodes in the domain. These scores are functions of the two-way and one-way counts in the data, and can be calculated once at the beginning of the algorithm. Once the scores are calculated, the algorithm does not need access to the data. In particular, for a domain of variables $X=\{X_1, \ldots, X_n\}$, the algorithm requires the contingency tables $SS(X_i, X_j)$ for all i and j.

Continuous and Ordered Variables

It is noted that as described, embodiments of the invention can be used with both continuous variables and ordered variables, if they are used with domains for which the presence or absence of these values in the data is informative.

Continuous and ordered variables are known in the art. A continuous variable can be defined as taking on values from one or more interval of the real line; temperature is an example. An ordered variable can be defined as taking on values from one or more (potentially infinite) intervals from the set of integers; years of education is an example of an ordered variable.

The techniques described in this application can be applied to these types of variables by treating them as special binary variables: either the variable was present or absent in the data. Statistics are kept track for the variables that are present.

For extracting counts specifically, "missing" is used as the default value. While counting the non-default ("present") values, sufficient statistics are also collected(e.g. the mean and standard deviation for Gaussian continuous, or the mean for Poisson, ordered). These sufficient statistics are used to parameterize and/or score the models, as has been described. The efficient derivation of the default ("missing") counts is done also as has been described.

Conclusion

Extraction of two-way counts utilizing a sparse representation of a data set has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computer-implemented method comprising:

inputting a data set having a plurality of records, each record having at least one attribute, each attribute having a default value;

storing a sparse representation of each record, including storing the value of an attribute of the record only upon determining that the attribute has a value varying from the default value;

generating a data model of the data set, the data model selected from the group essentially consisting of a naïve-Bayes model, a decision tree, and Bayesian-network branchings, utilizing the sparse representation of each record, including initially extracting two-way counts from the sparse representation of each record by counting one-way counts and the two-way counts for values of the attributes varying from the default values concurrently in a single pass, and deriving one-way counts and the two-way counts for the default values of the attributes from at least the one-way counts and the two-way counts for the values of the attributes varying from the default values; and, outputting the data model.

2. The method of claim 1, wherein extracting two-way counts from the sparse representation comprises constructing a contingency table of two-way counts.

3. The method of claim 1, wherein extracting two-way counts from the sparse representation comprises:

deriving the one-way counts for the default values of the attributes from the one-way counts for the values of the attributes varying from the default values; and, deriving the two-way counts for the default values of the attributes from the two-way counts and the first one-way counts for the values of the attributes varying from the default values, and from the one-way counts for the default values of the attributes.

4. A computer-readable medium having processor instructions stored thereon for execution by a processor to cause performance of a method comprising:

inputting a data set having a plurality of records, each record having at least one attribute, each attribute having a default value;

store a sparse representation of each record, including storing the value of an attribute of the record only upon determining that the attribute has a value varying from the default value;

generating a data model of the data set, the data model selected from the group essentially consisting of a naïve-Bayes model, a decision tree, and Bayesian-network branchings, utilizing the sparse representation of each record, including initially extracting two-way counts from the sparse representation of each record by counting one-way counts and the two-way counts for values of the attributes varying from the default values concurrently in a single pass, and deriving one-way counts and the two-way counts for the default values of the attributes from at least the one-way counts and the two-way counts for the values of the attributes varying from the default values; and, outputting the data model.

5. The medium of claim 4, wherein extracting two-way counts from the sparse representation comprises constructing a contingency table of two-way counts.

6. The medium of claim 4, wherein extracting two-way counts from the sparse representation comprises:

deriving the one-way counts for the default values of the attributes from the one-way counts for the values of the attributes varying from the default values; and, deriving the two-way counts for the default values of the attributes from the two-way counts and the first one-way counts for the values of the attributes varying from the default values, and from the one-way counts for the default values of the attributes.

7. The medium of claim 4, wherein extracting two-way counts from the sparse representation comprises constructing a contingency table of two-way counts.

8. A computerized system comprising:

a sparse representation of each record of a plurality of records of a data set, each record having at least one attribute, each attribute having a default value, such that the sparse representation includes the value of an attribute of the record only upon the attribute having a value varying from the default value;

a set of two-way counts based on the sparse representation of each record;

a data model of the data set, the data model selected from the group essentially consisting of a naïve-Bayes model, a decision tree, and Bayesian-network branchings, based on the set of two-way counts and the sparse representation of each record; and, a model generator to extract the set of two-way counts from the sparse representation and to generate the data model from the set of two-way counts and the sparse representation, the generator initially extracting the set of two-way counts by counting one-way counts and two-way counts for values of the attributes varying from the default values concurrently in a single pass, and deriving one-way counts and two-way counts for the default values of the attributes from at least the one-way counts and the two-way counts for the values of the attributes varying from the default values.

9. The system of claim 8, wherein the model generator comprises a computer program.

10. The system of claim 8, wherein the model generator performs a method comprising constructing a contingency table of two-way counts.

* * * * *